Jan. 28, 1947.　　　　C. K. NOVOTNY　　　　2,415,023
METHOD OF MAKING TIRE FABRIC
Filed March 20, 1941
FIG. I
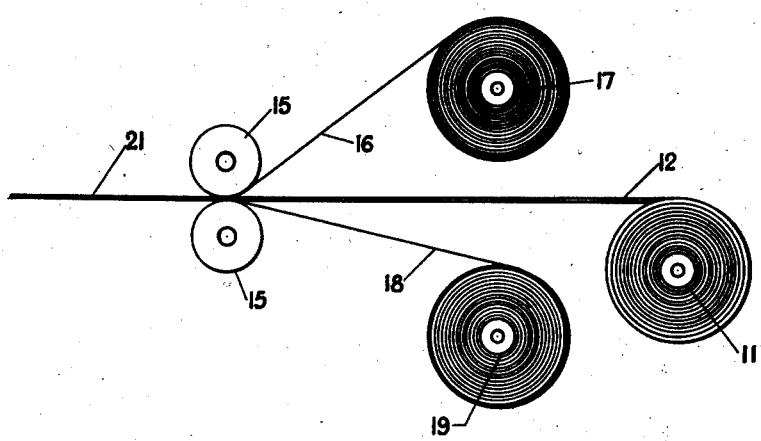
FIG. II
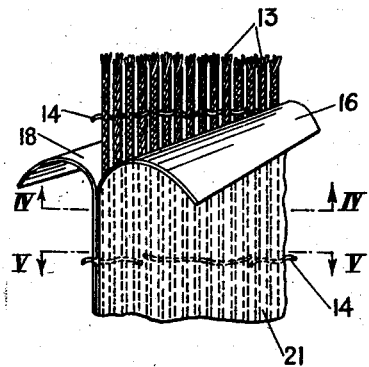
FIG. III
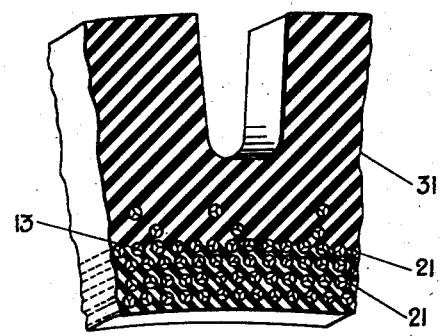
FIG. IV
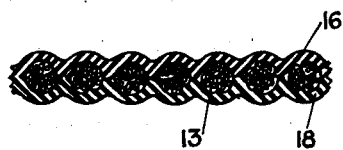
FIG. V
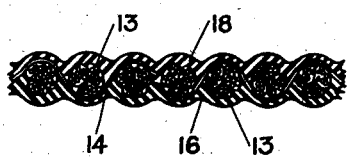
INVENTOR
CHARLES K. NOVOTNY
BY
ATTORNEYS Patented Jan. 28, 1947

2,415,023

UNITED STATES PATENT OFFICE 2,415,023

METHOD OF MAKING TIRE FABRIC

Charles K. Novotny, Akron, Ohio, assignor to The Firestone Tire & Rubber Company, Akron, Ohio, a corporation of Ohio Application March 20, 1941, Serial No. 384,289

3 Claims. (Cl. 154—90)

This invention relates to coating fabrics, especially to coated, substantially weftless fabrics and to methods, or procedure, for manufacturing same and to the pneumatic tire produced therefrom.

Tire fabric is a good example of a fabric of the above type. Heretofore, substantially all tire fabrics have been made from warp cords having relatively thin, or fine weft cords woven therebetween to secure the warp cords together, which fabric is passed between the nip of a calender which forces rubber onto and around the cords to produce the desired rubber covered fabric. One problem involved in constructing pneumatic tires, especially from this type of tire fabric, is that of obtaining properly tensioned, low stretch cord in the tire to prevent tire growth and to reinforce the tire more satisfactorily. Rubber covered tire fabric also can be produced without the use of weft threads in the fabric. In this instance, the handling and processing of the fabric is rather difficult, in that expensive and rather complex machinery is used. Then too, it still is necessary to use calenders, which are expensive both in initial apparatus cost and in the labor required to operate same, in order to deposit rubber upon the fabric.

The general object of the present invention is to provide a novel, inexpensive, easily practiced method for forming an improved rubber tire fabric, and to form a tire fabric of improved properties which aid in forming an improved tire.

A further object of the invention is to avoid the use of heavy, expensive equipment required in previously known methods for manufacturing rubber coated tire fabric.

A further object of the invention is to provide a substantially weftless rubber covered tire fabric from tire fabric initially having a weft thread therein.

The above and further objects of the invention will be made apparent as the description of the invention proceeds, which description has particular reference to the accompanying drawing, in which:

Figure I is a diagrammatic elevation of apparatus for performing the steps of the method of the invention;

Figure II is a plan of the fabric of the invention with the layers of rubber thereon partially rolled back;

Figure III is a fragmentary section of a tire constructed from the fabric of Figure II; and Figures IV and V are transverse sections taken on lines IV—IV and V—V of Figure II.

In its broadest sense, the invention relates to forming thin rubber sheets directly from latex so that tough, flow-resistant rubber sheets are obtained and one of such rubber sheets is associated with each side of a tire fabric, having fine weft threads therein, and is rolled or forced into and/or onto same. The pressure exerted on the tough rubber is transmitted thereby to force the warp cords of the fabric to lie in a plane and break the weft threads connecting the warp cords in numerous places, forcing the severed ends of the weft thread transversely apart. The fabric obtained has only short sections of weft thread therein and is not subjected to the "sawing" action by weft threads, as is the usual tire fabric prepared from fabric including fine weft threads. Since the cords of the fabric are in one plane and are stretched out straight in such plane, it is possible to lay such fabric in a tire under the exact tension and in the exact length desired.

Referring specifically to the accompanying drawing, a roll 11 is shown on which standard weak wefted tire fabric 12 is positioned. The fabric 12 includes a plurality of warp cords 13 which are positioned in parallel and are tied together by weak weft threads 14 of low pick count. The weft threads 14 cause the adjacent warp cords 13 to be positioned in different vertical positions, in that the weft threads are fairly taut and pass over one cord and under the next one, whereby the warp cords do not lie in a plane. Usually the fabric 12 has been resin coated, and dried before it is placed upon the roll 11. Any suitable composition, such as a latex-casein mixture, may be used in covering the fabric. The fabric 12 is pulled from the roll 11 by a pair of rolls 15, which are driven by any suitable means (not shown), and drawn therebetween. A tough rubber sheet 16, stored on a roll 17, is led to the upper surface of the fabric 12 before the fabric is drawn between the rolls 15, while a second rubber sheet 18, stored on a roll 19, is similarly led to the lower surface of the sheet 12. Both rubber sheets 16 and 18 are relatively thin and are of the same width as the fabric 12. The rubber sheets must be formed directly from latex so that the rubber forming same has never been masticated and is tougher and more resistant to plastic flow than rubber which has been washed, milled, and sheeted out in the usual manner. Any suitable method can be used to form the rubber sheets 16 and 18.

The rolls 15 are so positioned that they compress the rubber sheets 16 and 18 and fabric 12 as they are fed therebetween. Then, because the rubber sheets are made from tough, flow-resistant rubber, force applied to the rubber sheets by the rolls 15 is transmitted thereby so that rather than the rubber sheets being distorted and flowing around the individual cords of the wavy fabric 12, the rubber itself forces the cords 13 to assume positions in one plane which is substantially intermediate the nip of the rolls 15. Such positioning of the warp cords 13 breaks the fine weft threads 14 at a number of places, as shown, and transversely spaces the severed ends of the weft threads, due to the effective length of the thread in winding around the warp cords being lengthened. Note that the rubber, although slightly distorted, remains in sheet form and that the fabric 12 is embodied in a rubber body made from the rubber sheets 16 and 18 to form a tire fabric 21.

The rubber coated tire fabric 21, produced by the rolls 15 forcing the rubber sheets into the fabric sheet, may then be wrapped around a roll for storage purposes, or else may be immediately cut into the desired tire ply, as desired.

Figures IV and V show that the individual rubber sheets 16 and 18 are pressed together around the cords 13 as the fabric 12 is passed between the rolls 15, but that a noticeable dividing line exists therebetween. During vulcanization of the tire fabric, the rubber sheets are made integral. The fact that the weft threads 14 are broken into small sections also is clearly shown by Figure V.

It will be apparent that the fabric of the invention has particular features over previously known types of tire fabrics and fabric coating methods. That is, practice of the invention provides a rubber covered tire fabric having substantially all of the advantages of weftless tire fabric without the attendant disadvantages of weftless tire fabric production. The fabric, before being rubber covered, is easy to handle in that it has continuous weft threads therein, but the actual tire fabric made therefrom is not subjected to the injurious "sawing" action which is set up by continuous weft threads present in usual fabric constructions.

Figure III shows a section of a pneumatic tire 31, in which the fabric 21 is incorporated, which fabric and rubber thereon have been made into an integral body through vulcanization. In building the tire 31 in the usual manner upon a flat drum, the individual plies of the tire are cut to the same length and are positioned the same as tire fabric plies made from ordinary weft thread tire fabric wherein the individual cords are alternately raised out of, or pushed below their axial planes by weft threads. With such fabrics, slight extension or elongation of the cords occurs during the shaping and vulcanization of the tire made therefrom due to the pressure set up thereon bringing the cords into a more nearly axial planar position. However, no such movement can occur in fabric made according to the present invention. Therefore, the extra tensioning forces applied to the warp cords, especially during vulcanization (heating), produce cords in the resultant tire which have low stretch and high strength, even though average stretch cords were used in forming the fabric 12.

For example, the fabric used in tires made in accordance with the invention has had the following characteristics:

|  | Normal condition | | Bone dry | |
|---|---|---|---|---|
|  | Tensile strength | Per cent stretch under 10# load | Tensile strength | Per cent stretch under 10# load |
| Untreated fabric | 17.32 | 8.18 | 13.75 | 6.27 |
| Same fabric from vulcanized tire | 18.77 | 4.27 | 17.67 | 3.88 |
| Same fabric from 2nd vulcanized tire | 18.58 | 4.13 | 17.33 | 3.62 |

Hence it readily is seen that a tire having improved properties, due to the low stretch, high strength cord used therein, can be obtained by practice of the invention. Or, from another viewpoint, a tire having highly desirable properties can be produced by practice of standard tire forming methods, except that an inexpensive, easily practiced fabric forming process is substituted for the usual calendering process of depositing rubber on fabric.

The latex used in forming the rubber sheeting 16 and 18 may be compounded in any desired manner and normally contains the vulcanizing ingredients used in tire manufacture.

In some cases, it may be desirable to force a rubber sheet into only one side of a fabric, or to force the rubber sheets individually into opposed sides of a fabric, as long as the weft threads can be broken by such operations.

While one embodiment of the invention has been completely illustrated and described herein, it will be appreciated that modification hereof may be made without departing from the scope of the invention as defined in the appended claims.

What is claimed is:

1. A method of making rubber covered cord fabric, which includes the steps of placing a sheet of a tough flow-resistant rubber upon one side of a weak wefted cord fabric, and applying a substantially uniform pressure to the exposed side of the rubber sheet while supporting the other side of the fabric, said pressure being sufficient to force the warp cords of the fabric to lie in a single plane parallel to the plane of the outer surface of the rubber sheet and to break the weft threads of the fabric into a plurality of discontinuous threads.

2. A method of making rubber covered cord fabric, which includes the steps of placing a sheet of a tough flow-resistant rubber upon each side of a weak wefted cord fabric, and applying a substantially uniform pressure to the two exposed and opposite sides of the rubber sheets, said pressure being sufficient to force the warp cords of the fabric to lie in a single plane parallel to the plane of the outer surface and to break the weft threads of the fabric into a plurality of discontinuous threads.

3. A method of making rubberized tire cord fabric, which includes forming sheets of tough rubber directly from latex, placing one of said sheets upon each side of a weak wefted tire cord fabric, and applying pressure simultaneously to the two exposed and opposite sides of the rubber sheets, said pressure being sufficient to force the warp cords of the fabric to lie in a single plane parallel to the plane of the outer surface and to break the weft threads of the fabric into a plurality of discontinuous threads.

CHARLES K. NOVOTNY.